United States Patent Office 3,216,961
Patented Nov. 9, 1965

3,216,961
PROCESS OF MAKING POLYVINYL
BENZAL EMULSIONS
Osamu Fukushima, Kurashiki, Japan, assignor to Kurashiki Rayon Co., Ltd., a corporation of Japan
No Drawing. Filed Aug. 31, 1960, Ser. No. 53,054
Claims priority, application Japan, Sept. 5, 1959,
34/28,517
1 Claim. (Cl. 260—29.6)

The present invention relates to the manufacture of emulsions of water-insoluble polyvinyl benzal containing basic nitrogen.

In U.S. application Serial No. 20,012, filed April 5, 1960, there is described the acetalization of polyvinyl alcohol derivatives containing basic nitrogen with aldehydes containing no basic nitrogen, and the acetalization of copolymers or derivatives consisting primarily of polyvinyl alcohol with aldehydes containing no basic nitrogen, with basic nitrogen being introduced substantially simultaneously with the acetalization, the systems being rapidly agitated. I have discovered that, because of the presence of basic nitrogen, the polyvinyl acetal emulsion obtained had an excellent stability, a characteristic which had never before been attained in an emulsion of vinyl compounds and which persisted even when the emulsion was allowed to stand for long periods, was heated, or mixed with water-soluble polymers, or pigments, and the like. The diameter of the particles of such emulsified compounds is usually 2 to 3$\mu$. It is possible to use such an emulsion satisfactorily in the manufacture of fibers from a mixed spinning solution produced by mixing the emulsion with a spinning solution containing, for example, polyvinyl alcohol fiber forming material or regenerated cellulose. I, however, have recognized the necessity of obtaining emulsions of polyvinyl alcohol, derivatives containing particles of 0.5$\mu$ or less in average diameter for certain fields of application, for example, for use in the coating of fibers or fabrics by means of emulsions, or the direct manufacture of films from aqueous emulsion. Much effort has been expended in attempting to produce an emulsion consisting of such minute particles.

It is thus an object of the present invention to provide a process for producing stable emulsions of very small particle size.

It is a more specific object of the present invention to provide a process of making emulsions of the character indicated of polyvinyl alcohol derivatives.

We have discovered that very stable polyvinyl benzal emulsions containing particles of about 0.5$\mu$ to 0.01$\mu$ in average diameter can be readily obtained by dissolving a water-insoluble polyvinyl benzal containing basic nitrogen in a water-soluble cyclic ether compound or in a mixed solvent composed of water and water-soluble cyclic ether compounds, and after dissolution, adding, under agitation, water or an aqueous solution containing surface active agents, followed by removal of the water-soluble cyclic ether compounds.

In spite of the fact that polyvinyl benzal containing no basic nitrogen cannot be emulsified satisfactorily by the method of this invention, with a nitrogen-containing polyvinyl benzal prepared, for example, by introducing basic nitrogen by copolymerization with a vinyl-monomer containing basic nitrogen or with a vinyl-monomer containing radicals convertible to basic nitrogen, or by the chemical reaction with aldehydes or epoxy compounds containing radicals convertible to basic nitrogen, a stable emulsion consisting of super fine particles is readily obtainable.

Thus, in accordance with this invention, water-insoluble polyvinyl benzal containing basic nitrogen is dissolved in a water soluble cyclic ether compound or in a mixture of water and a water-soluble cyclic ether compound, and, after the addition of water or of an aqueous solution of a surface-active agent, under agitation, the water-soluble cyclic ether compound is removed from the resulting composition. There is thus obtained efficiently and effectively an emulsion of a polyvinyl alcohol derivative consisting of minute particles having an average diameter of 0.5$\mu$ or less which is very stable upon storage, upon heating, and like treatment and is particularly suitable for use in the production of fibers from polyvinyl alcohol, regenerated cellulose, and the like.

Although the polyvinyl benzal containing no basic nitrogen dissolves in a mixed solution of a water-soluble cyclic ether such as tetramethylene oxide and water, irrespective of the degree of benzalization, it effects a rapid elevation of viscosity when water or an aqueous solution containing surface active agents is added to it, and the mixed solvent composed of water and tetramethylene oxide separates from the polyvinyl benzal and it coagulates. However, when polyvinyl benzal containing basic nitrogen is mixed in the mixed solvent composed of a water-soluble cyclic ether such as tetramethylene oxide, and water, and water is added under agitation, some elevation of viscosity is observed initially but turbidity increases gradually, and when an aqueous solution of a surface-active agent is added, a rapid decline in the viscosity takes place. The polyvinyl benzal containing basic nitrogen becomes dispersed to super fine particles of 0.5$\mu$ or less diameter. Accordingly, when the cyclic ether such as tetramethylene oxide is removed by distillation to leave the aqueous emulsion, the minute particles of dispersed polyvinyl benzal do not coagulate, even when heated for many hours, making it possible to produce a very stable aqueous emulsion. Furthermore, the emulsion is very stable during many hours of concentration when it is desired to elevate its concentration.

In view of the foregoing considerations, the effect of the introduced basic nitrogen on the preparation of a polyvinyl benzal emulsion appears to be based on the repulsion of electric charges and the hydrophilic property imparted by this basic nitrogen, these being the major contributing factors responsible for the stability of the emulsion and the ease with which the emulsion is produced. The introduced basic nitrogen thus may be said to exhibit, in general, the action of an emulsifier during the manufacture of the emulsion.

Moreover, by reason of the introduction of basic nitrogen, not only is the manufacture of an emulsion of good quality made possible, but a polyvinyl benzal emulsion is obtained which is stable either at high or low temperature, even when pigments, plasticizers, aqueous solutions of polymers, or the like, are mixed into the emulsion.

The method of this invention is economically advantageous because the emulsion can be manufactured without using an emulsifier or plasticizer, as are used in the case of commonly practiced emulsifying operations, and if the boiling point of the solvent used is lower than that of water, it can be readily removed and reclaimed by distillation after the emulsion is produced. As the result, a substantially constant amount of reusable solvent will always be available. The emulsion obtained is further characterized by the fact that any plasticizers or active agents suitable for the use to which the emulsion is to be put can be added because at the time it is produced it does not contain any solvents, plasticizers, emulsifiers, or the like and is thus, a free aqueous emulsion.

However, to form a stable polyvinyl benzal emulsion, it is necessary, in applying this invention, to observe certain ranges with respect to the amount of basic nitrogen, the amount of conversion into benzal by the reaction with benzaldehyde, the number of units of unreacted vinyl alcohol, and the amount of neutralized sulfuric acid present as sulfate when the reaction for introducing basic nitrogen is carried out by using sulfuric acid as a catalyst, as in the case of amino-acetalization. A stable emulsion is not necessarily obtainable with any amount of basic nitrogen or with any degree of benzalization. Exact ranges cannot be specified because of the differences in the influence of these several variables upon the hydrophobic properties imparted to the polymer and upon the ease with which the emulsion can be manufactured. In general, however, 0.1 to 3.0% by weight of basic nitrogen, a 30 to 70% degree of benzalization, and less than 50% of combined neutralized acid are suitable for the manufacture of emulsions in accordance with this invention.

In forming the polyvinyl benzal emulsion, neither an emulsifier nor a plasticizer is necessary. However, any emulsifier or any plasticizer commonly used in forming polyvinyl benzal emulsions may be employed if desired.

Any water-soluble cyclic ether may be employed in accordance with this invention, but we have found tetramethylene-oxide, trimethylene-oxide, and pentamethylene-oxide to be particularly suitable, the solvent being used alone or in conjunction with up to about 50% by weight of water to form a mixed solvent. Sufficient solvent is employed to dissolve the polyvinylbenzal, e.g. to form a 20% solution, and sufficient water is then added, alone or in the presence of a surface-active agent to the solution under high-speed agitation, e.g. 1000 r.p.m. or more, to cause separation of the emulsified phase, e.g. to provide a concentration of 10 to 30 weight percent of the polyvinyl benzal in water.

The invention will be further understood from the following specific examples of practical application. However, it will be understood that these examples are not to be construed as limiting the scope of the present invention in any manner. In these examples, all parts are by weight, unless otherwise indicated. The percentages indicated above are also by weight.

*Example 1*

An aqueous solution consisting of 3% of polyvinyl alcohol, 1.5% of benzaldehyde, 20% of sulfuric acid and 1% of a dispersant was reacted by heating under agitation at 60° C. for one hour. To the reaction product were then added 6% of β-cyclohexyl amino-butylaldehyde dimethylacetal and 3% of benzaldehyde and the reactants were again heated under agitation at 60° C. for one hour. Polyvinyl benzal in finely-divided form separated from the aqueous medium. After filtering and washing the precipitate thoroughly with warm water of 50° C., the 15% of combined acid was neutralized with an aqueous solution of ammonia, and the product was dried.

The polyvinyl benzal thus obtained had a degree of benzalization of 60% and contained 1.06% of basic nitrogen. This polyvinylbenzal was added in the course of 2 hours to a mixed solvent at 70° C. consisting of 3.5 parts of water and 6.5 parts of tetramethylene-oxide to form a 10% solution. Thereupon, 4.5 parts of water were gradually added under high speed agitation (at least 1,000 r.p.m.). The liquid turned slowly cloudy and whitish in appearance and when the addition of water was completed, there was obtained an emulsion of polyvinyl benzal.

The tetramethylene-oxide was then completely removed by distillation, and there was obtained a stable polyvinyl benzal emulsion containing particles of 0.3μ average diameter in 12% concentration.

*Example 2*

An aqueous solution containing 3% of polyvinyl alcohol, 2% of benzaldehyde, 1% of a dispersant, and 20% of sulfuric acid was reacted under agitation at 60° C. for 60 minutes. To the reaction product were added 6% of β-cyclohexyl-amino-butyraldehyde dimethylacetal and 3% of benzaldehyde, and reaction was continued under agitation at 60° C. for 60 minutes. Polyvinyl benzal separated out in a finely-divided form. This precipitate was filtered, washed with warm water at 80° C., and dried.

The polyvinyl benzal thus obtained had a degree of benzalization of 65% and contained 0.6% of basic nitrogen.

This polyvinylbenzal was added in the course of 2 hours to a mixed solvent consisting of 2 parts of water and 8 parts of tetra-methylene-oxide at 70° C. to form a 10% solution. After the solution had been formed, 3 parts of water were gradually added under high speed agitation. Upon completely removing the tetramethylene-oxide by distillation, there was obtained a polyvinyl benzal emulsion of 20% concentration containing particles of 0.05μ average diameter.

*Example 3*

When an aqueous solution containing 5% of polyvinyl alcohol, 4% of benzaldehyde, 3% of β-cyclohexyl-amino-acetaldehyde dimethylacetal, 2% of a dispersant, and 20% of sulfuric acid was reacted under agitation at 50° C. for 3 hours, polyvinyl benzal separated out in finely divided form. This precipitate was filtered off, washed with warm water at 50° C., and then dried. The polyvinyl benzal thus reovered had a 50% degree of benzalization and contained 0.3% of basic nitrogen. The polyvinylbenzal was then slowly added during a period of 2 hours, into a mixed solvent at 70° C. consisting of 3 parts of water and 7 parts of tetramethylene-oxide to form a 9% solution. After removal of the tetramethylene-oxide from the solution by distillation, a stable emulsion of polyvinyl benzal of 30% concentration and an average particle diameter of 0.1μ was obtained.

*Example 4*

An aqueous solution containing 3% of polyvinyl alcohol, 1.2% of benzaldehyde, 1% of a dispersant, and 20% of sulfuric acid was reacted under agitation at 60° C. for 1 hour, followed by addition to the reaction bath of 6% of β-cyclohexyl-amino-butylaldehyde dimethylacetal and 1.5% of benzaldehyde. Reaction was then continued under agitation at 60° C. for 60 minutes, the polyvinyl benzal separating out in finely-divided form. The precipitate was separated by filtration and washed and the 40% of combined sulfuric acid was neutralized at 50° C. with an aqueous solution of ammonia, and the product was thoroughly washed and dried. This polyvinyl benzal had a degree of benzalization of 40% and contained 2.0% of basic nitrogen.

The polyvinyl benzal thus obtained was then dissolved in the course of 2 hours, in a mixed solvent at 70° C. consisting of 5 parts of water and 5 parts of tetramethyleneoxide to form a 15% solution. Following completion of the solution, 2 parts of a 1% aqueous solution of a surface active agent was gradually added under high speed agitation. Upon subsequent removal of tetramethyleneoxide by distillation, there was obtained a stable emulsion of polyvinyl benzal of 10% concentration with a mean particle diameter of 0.2μ.

*Example 5*

A polyvinyl benzal obtained by following the method described in Example 4 was dissolved by gradually adding it, during a period of 2 hours, to a mixed solvent at 70° C. consisting of 5 parts of water and 5 parts of pentamethyleneoxide to form a solution as in Example 4. To this solution, 5 parts of a 0.1% aqueous solution of ammonia was added slowly dropwise under high speed agitation. The pentamethyleneoxide was then removed through distillation, and an emulsion of polyvinyl benzal of 10% concentration containing particles of 0.5 to 1μ in diameter was obtained.

Example 6

An aqueous solution consisting of 3% of polyvinyl alcohol, 2% of benzaldehyde, 1% of a dispersant, and 50% of sulfuric acid was reacted at 60° C. for 60 minutes, and the precipitate which formed was removed by filtration and dried.

A polyvinyl benzal was thus obtained in finely-divided form which had a 60% degree of benzalization. Ten grams of this finely-divided compound were mixed with 3 grams of 1-dimethyl-amino-2-3-epoxypropane, and the mixture was reacted in a pressure vessel at 120° C. for 2 hours. After this reaction, the finely-divided product obtained was thoroughly washed with warm water and collected by filtration. This product contained 1.5% of basic nitrogen.

This nitrogen-containing polyvinyl benzal was dissolved in mixed solvent consisting of 3 parts of water and 7 parts of tetramethyleneoxide to produce a 20% solution. After the solution was formed, 3 parts of an aqueous solution containing 0.5% of a dispersant was gradually added under high speed agitation. Upon subsequent removal of the tetramethyleneoxide by distillation, there was obtained a stable 30% polyvinyl benzal emulsion containing particles of $0.3\mu$ mean diameter.

Example 7

Bulk polymerization was effected at 60° C. upon a mixture of 450 grams of vinylacetate and 45 grams of 5-ethyl-2-vinyl-pyridine, 5.0 grams of benzoylperoxide being used as the catalyst. At the end of 48 hours, the copolymer was dissolved in methanol, reprecipitated in water, and was washed in boiling water. There were thus obtained 400 grams of copolymer.

This product was dissolved in 3 liters of methanol, and saponification was effected by means of a 2-N aqueous solution of caustic soda. The saponified product amounted to 200 grams and it contained 1.2% of nitrogen.

An aqueous solution consisting of 3% of the polyvinyl alcohol containing basic nitrogen thus obtained as described above, 2.0% of benzaldehyde, 1% of a dispersant, and 20% of sulfuric acid were reacted at 50° C. for 3 hours. After the reaction was completed, polyvinyl benzal was found to have separated in finely-divided form. This product, which had a degree of benzalization of 55%, was filtered off and washed with warm water at 90° C., and then dried.

The polyvinyl benzal was then dissolved in a mixed solvent consisting of 4 parts of water and 6 parts of tetramethyleneoxide, to form a solution of 20% concentration, and 6 parts of water were then added dropwise under rapid agitation. When the tetramethyleneoxide was removed by distillation, a 20% polyvinyl benzal emulsion having mean particle diameter of $0.5\mu$ was obtained.

Example 8

One hundred grams of a copolymer consisting of vinylacetate and 15.0 mol percent of methylvinyl ketone were dissolved in 0.5 liter of ammonia saturated methanol, and after adding 1 gram of Raney nickel, the reaction was effected at 80° C. for 4 hours in an autoclave of 1 liter capacity filled with hydrogen at a pressure of 42 atmospheres gage. The product precipitated with water and was washed. The content of basic nitrogen in the product was 1.4%.

Benzalization of the product was effected in the manner described in Example 7, and a polyvinyl benzal having a 50% degree of benzalization was obtained. This polyvinyl benzal was dissolved in a mixed solvent consisting of 4 parts of water and 6 parts of pentamethyleneoxide to form a solution of 20% concentration. A whitish cloud appeared when 6 parts of a 0.1% aqueous solution of a surface active agent were gradually added to this solution under rapid agitation, and fine particles separated. Upon subsequent removal of the pentamethyleneoxide by distillation, a 20% emulsion of polyvinylbenzal having a mean particle diameter of $0.1\mu$ was obtained.

Example 9

An aqueous solution containing 3% of polyvinyl alcohol, 2% of benzaldehyde, and 0.5% of chloroacetaldehyde was reacted at 50° C. for 3 hours, and after diluting the product with water, an acetalized polyvinyl alcohol containing halogen was recovered. This product was treated under agitation at 80° C. for 10 hours in an aqueous solution containing 30% of ethylenediamine. After removing unreacted ethylenediamine by dialysis, there was recovered a polyvinylbenzal having a 50% degree of benzalation, and containing 1.0% of basic nitrogen.

This polyvinyl benzal was dissolved in a mixed solvent consisting of 3 parts of water and 7 parts of tetramethyleneoxide to form a solution of 10% concentration. Upon the gradual addition of 2 parts of water under rapid agitation, an emulsion was formed when the tetramethyleneoxide was removed by distillation, there was recovered at 20% polyvinylbenzal emulsion having a mean particle size of $0.3\mu$ diameter.

In the foregoing examples, representative procedures have been set forth for producing polyvinyl benzal containing basic nitrogen. It will be understood, however, that the invention is not limited to any particular method of forming the polyvinyl alcohol derivative which is employed. Thus, the nitrogen-containing polyvinylbenzal may be produced by the procedure described in Osugi et al. U.S. Patent No. 2,906,594 wherein polyvinyl alcohol is reacted with an amino benzaldehyde, or by the procedure described in the co-pending application of Fukushima and Kurashige, Serial No. 31,824, filed May 26, 1960, now United States patent 3,142,532, wherein polyvinyl alcohol is reacted with a compound containing basic nitrogen and with benzaldehyde, or by the procedure described in the co-pending application of Matsubayashi and Fukushima United States application Serial No. 20,-012, filed April 5, 1960, wherein vinyl acetate is copolymerized with monomers containing basic nitrogen such as vinyl pyridine, and the copolymers are treated with benzaldehyde, and then saponified, and the like, as previously mentioned and shown in the examples.

In general, various known types of anionic, non-ionic, and cationic surface-active agents or dispersants are suitably used, but it is preferred to use a non-ionic surface-active agent such as polyoxyethylenedodecyl ether, or a cationic surface-active agent such as dodecyltrimethylammonium chloride. In the foregoing examples, for instance, the dispersant is suitably polyoxyethylenedodecyl ether. As protective colloids, water-soluble polymers such as polyvinyl alcohol, partially-saponification products of polyvinyl acetate, gelatin, soluble starch, and amino-acetalized polyvinyl alcohol, are suitably used.

The surface-active or dispersing agents and protective colloids which are suitably employed are, in addition to those mentioned above, any of the many surface active, dispersing agents and protective colloids known to those skilled in the art of making emulsions or dispersions of polymers.

It will therefore be understood that, unless otherwise indicated, conventional operations and conventional apparatus are employed in carrying out the process of this invention including conventional mixing and emulsifying processes and units. The conditions and the relative relationships set forth in the examples are those preferred in carrying out the process of the invention but it will be understood that other conditions and relationships may be used within the scope of the invention.

The stable polymer dispersions produced in accordance with the present invention are particularly suitable for the spinning of fibers in accordance with known processes used in the spinning of polyvinyl alcohol and polyvinyl alcohol derivatives, particularly the so-called "wet-spinning" techniques as described, for example, in Cline et al.

U.S. Patent 2,610,360 and the above-mentioned Osugi et al. patent. An especially preferred spinning technique is described in copending application Serial No. 336,166 of Tomonari et al., filed February 10, 1953, now United States Patent 2,988,802.

After formation of the fibers by wet spinning the filaments can be further treated by stretching, heat treating, acetalization, and the like to produce fibers with desirable and outstanding properties, using known techniques as described in said patents.

It will also be understood that various changes and modifications in addition to those indicated above may be made in the embodiments herein described without departing from the scope of the invention as defined in the appended claim. It is intended, therefore, that all matter contained in the foregoing description shall be interpreted as illustrative only and not as limitative of the invention.

I claim:

A process for preparing a storage and heat stable aqueous emulsion of superfine particles of water-insoluble polyvinyl benzal which comprises, dissolving a water-insoluble polyvinyl benzal containing about 0.1% to about 3.0% by weight of basic nitrogen as part of the polyvinyl benzal polymer structure and having a degree of benzalization of about 30% to about 70% in a solvent;

said solvent selected from the group consisting of water-soluble cyclic ethers and aqueous mixtures of water-soluble cyclic ethers containing up to about 50% by weight of water and said solvent having a boiling point lower than the boiling point of water;

adding, with agitation, a fluid to the resulting solution formed by said dissolving of said polyvinyl benzal in said solvent;

said added fluid selected from the group consisting of water and aqueous solutions of a surface-active agent;

said agitation and said fluid addition producing an emulsion;

and removing, by distillation, said water-soluble cyclic ether from said produced emulsion to obtain a storage and heat stable aqueous emulsion of superfine particles of water-insoluble polyvinyl benzal containing about 10% to about 30% by weight of polyvinyl benzal wherein the average diameter of said particles is about $0.01\mu$ to $0.5\mu$.

References Cited by the Examiner

UNITED STATES PATENTS

| 2,269,217 | 1/42 | McNally et al. | 260—73 |
| 2,443,893 | 6/48 | Collins | 260—29.6 |
| 2,906,594 | 9/59 | Osugi et al. | 260—91.3 |

OTHER REFERENCES

Doolittle: "The Technology of Solvents and Plasticizers," New York, John Wiley & Sons, Inc., London, Chapman & Hall, Ltd., pages 167–169.

MURRAY TILLMAN, *Primary Examiner.*

DONALD ARNOLD, LEON J. BERCOVITZ,
*Examiners.*